(12) United States Patent
Betz et al.

(10) Patent No.: US 11,189,012 B2
(45) Date of Patent: Nov. 30, 2021

(54) ARRANGEMENT HAVING A COORDINATE MEASURING MACHINE OR MICROSCOPE

(71) Applicant: Carl Zeiss Industrielle Messtechnik GmbH, Oberkochen (DE)

(72) Inventors: Patrick Betz, Heuchlingen (DE); Oliver Unrath, Königsbronn (DE); Markus Ritter, Heidenheim (DE)

(73) Assignee: Carl Zeiss Industrielle Messtechnik GmbH, Oberkochen (DE)

( * ) Notice: Subject to any disclaimer, the term of this patent is extended or adjusted under 35 U.S.C. 154(b) by 105 days.

(21) Appl. No.: 16/776,437

(22) Filed: Jan. 29, 2020

(65) Prior Publication Data
US 2021/0118091 A1  Apr. 22, 2021

(30) Foreign Application Priority Data
Oct. 21, 2019 (DE) .................... 20 2019 105 838.2

(51) Int. Cl.
| | |
|---|---|
| *G06T 3/40* | (2006.01) |
| *G06T 7/11* | (2017.01) |
| *G01B 11/00* | (2006.01) |
| *G06T 7/00* | (2017.01) |

(52) U.S. Cl.
CPC ............ *G06T 3/403* (2013.01); *G01B 11/005* (2013.01); *G06T 7/001* (2013.01); *G06T 7/11* (2017.01); *G06T 2207/10056* (2013.01)

(58) Field of Classification Search
CPC . G06T 3/403; G06T 7/001; G06T 7/11; G06T 2207/10056; G01B 11/005
See application file for complete search history.

(56) References Cited

U.S. PATENT DOCUMENTS

| | | | | |
|---|---|---|---|---|
| 2004/0096118 | A1* | 5/2004 | Liang | ................... G01J 3/2823 382/284 |
| 2014/0313312 | A1* | 10/2014 | Gaiduk | .................. G02B 21/24 348/79 |
| 2017/0116715 | A1* | 4/2017 | Takayama | .............. G02B 21/14 |
| 2017/0292827 | A1 | 10/2017 | Haverkamp | |

FOREIGN PATENT DOCUMENTS

| | | |
|---|---|---|
| DE | 10 2013 006 994 A1 | 10/2014 |
| DE | 10 2016 106 696 A1 | 10/2017 |

\* cited by examiner

*Primary Examiner* — Ruiping Liz
(74) *Attorney, Agent, or Firm* — Miller Johnson

(57) ABSTRACT

A method includes generating image signals from which a two-dimensional image is generated. The method includes generating object image signals by capturing an examination object arranged in a space. The method includes generating overview image signals by capturing an overview of the space. The method includes receiving image information included in the generated object image signals and the generated overview image signals. The method includes combining a two-dimensional object image, generated from the object image signals, with a two-dimensional perspectively distorted overview image of the space, generated from the overview image signals, to form a two-dimensional output image. The method includes scaling the received image information with respect to an image size for forming the output image in a manner such that at least one dimension of the examination object captured both in the object image and in the overview image has a same size in the output image.

19 Claims, 3 Drawing Sheets

ARRANGEMENT HAVING A COORDINATE MEASURING MACHINE OR MICROSCOPE

CROSS-REFERENCE TO RELATED APPLICATIONS

This application claims priority to German Application No. 20 2019 105 838.2 filed Oct. 21, 2019. The entire disclosure of the application referenced above is incorporated by reference.

FIELD

The present disclosure relates to examination devices and more particularly to coordinate measuring machines and microscopes.

SUMMARY

The innovation relates to an arrangement having an examination device. The examination device may be a coordinate measuring machine or a microscope. The examination device has a capture device having a first image generating device and a second image generating device. The first and the second image generating device are each designed to generate image signals from which it is possible to generate a two-dimensional image. The first image generating device is positioned and designed such that it is possible for it to generate object image signals during the operation of the measurement device by capturing an examination object arranged in a space, that is to say a measurement object of the coordinate measuring machine or an object that is to be examined by way of the microscope. As used in the present application, the term "examination" includes "measurement."

The second image generating device is positioned and designed such that it is possible for it to generate overview image signals by capturing an overview of the space, specifically before and/or during an examining operation—and in particular before, during and/or after the generation of the object image signals by the first image generating device. It is possible for the second image generating device to use the same device for generating image signals as the first image generating device but to have a different optical system that allows the recording of an overview image.

In a corresponding method for operating a coordinate measuring machine or microscope, the first and the second image generating device each generate image signals from which a two-dimensional image is generated. The first image generating device generates the object image signals. The second image generating device generates the overview image signals.

Where this description refers to an object, this includes the case that more than one object and in particular at least one workpiece is/are located in the space and additionally that more than one object or workpiece is captured by the first image generating device of the measurement device.

The image signals are in particular the primary signals generated by the image generating device from the capturing of the object. In the case of a digital camera, these are for example the image values of the pixels that are generated by integrating the incident object radiation over the exposure time interval. In the case of a laser scanner, the primary image signals are for example the times of flight of the radiation or the phase shifts of the measurement radiation, from which the distance from the reflection site on the surface of the examination object is ascertained. In any case, the image signals contain image information from which it is possible in particular to generate a two-dimensional image. Said image information can be processed further in particular by the image generating device itself or by a device that is connected to a signal output of the image generating device. In that case, for example, corrections such as a distortion correction for correcting an optical aberration can be performed, image information can be extracted or suppressed for example by way of digital filters, and/or two-dimensional image information can be generated from three-dimensional image information. The first image generating device can be an optical sensor.

Frequently, optical sensors for measuring a measurement object are used on coordinate measuring machines. Optical sensors are also used as components of microscopes. Optical sensors are understood to be sensors that receive electromagnetic radiation from the object. With respect to the present innovation, in particular imaging optical sensors are considered, wherein the image may be a one-dimensional, two-dimensional, or three-dimensional image. One-dimensional images are generated for example by sensors having a line matrix made up of sensor elements. For example, conventional digital cameras generate two-dimensional images. However, it is also possible for example that two-dimensional regions of the measurement object are scanned using point sensors or one-dimensional sensors and that two-dimensional images are generated in this way. Three-dimensional images can be generated for example by TOF (time-of-flight) cameras. Another possibility in this respect is provided by stereo camera systems or pattern projection systems. The image information that is generated can therefore be one-dimensional, two-dimensional, or three-dimensional, depending on the type of sensor. For example it is possible by combining the image information from a plurality of line scan cameras, by scanning the space using at least one line scan camera, by accepting or processing an image from a two-dimensional camera or by generating a projection image or sectional image from three-dimensional image information to generate a two-dimensional object image that is used by embodiments of the innovation. However, the innovation is not limited to the examples of optical sensors mentioned.

Furthermore, a space for arranging an object is provided, for example a workpiece, which is captured by the optical sensor. Coordinate measuring machines and microscopes frequently have at least one delimitation of the space, for example a fixed base or a movable plate for placement of the object. Optionally, in particular in the case of microscopes, additional holders may be provided for fixing the object in its instantaneous position.

It is advantageous in particular for planning, for manual control, and for monitoring the measurement operation of a coordinate measuring machine and the operation of microscopes if an object image of the captured object is represented together with an overview image. The overview image is an image of the space in which the object that is to be captured can be positioned. In particular, a plurality of objects that are to be captured and further objects, which may be, for example, parts of and/or accessories belonging to the coordinate measuring machine or the microscope, can be located in the space. Therefore, the capture device has the second image generating device, which generates the overview image signals. The second image generating device can also be one of the aforementioned optical sensors. However, generating a telecentric image and thus a perspectively non-distorted image is more complicated in the case of an overview image than it is in the case of a relatively small capturing image of the object that is to be captured.

It is an object of the present innovation to specify an arrangement having a coordinate measuring machine or microscope of the type mentioned in the introductory part, which make possible a simultaneous representation of the object image and the overview image that is quickly capturable for an observer, with little outlay relating to the generation of the overview image. In particular, an adjusted representation of the object image and of the overview image is to be automatically prepared in the case of a position change of the region captured by the first image generating device.

A corresponding problem forms the basis of a method for operating a coordinate measuring machine or microscope of the type mentioned in the introductory part.

It is proposed to combine a two-dimensional object image, generated from the object image signals, with a two-dimensional perspectively distorted overview image of the space, generated from the overview image signals, to form a two-dimensional output image. In particular, an image representation device can be provided on which the output image is represented so as to be visually recognizable for a user.

It is furthermore proposed that the image processing device scales the received image information with respect to an image size in a manner such that the object captured both in the object image and in the overview image has the same size in the output image. Since the object in the object image does not have to have been captured in its entirety, the "same size" does not refer to the entire object. Neither does the wording refer to the volume of the object or of the object part, but rather to its one-dimensional or two-dimensional appearance in the images. In general terms, at least one dimension of an object captured both in the object image and in the overview image therefore has the same size in the output image. In other words, the object image and the overview image therefore have the same image scale, with respect to at least one of the two image directions of the output image, at least in an image region in which part of the object is imaged. The image scale is understood to mean the ratio of an imaged length to the length of an image unit (for example of a pixel) that images an object of the imaged length. In the case of imaging that is not telecentric on the object side, the image scale is dependent on the distance of the imaged region from the image generating device.

The representation of the object or of the object part with the same size in the output image overcomes the disadvantage of the perspective distortion of the overview image and allows the observer of the output image to easily capture simultaneously the image content of the overview image and of the object image. In particular, if the size were not adjusted, i.e. without scaling, the observer would have to perform size adjustment of the overview image for example mentally to correctly fit the object image into the overview image. Such specific adaptation is advantageous in particular during planning, control and monitoring of a measurement or capturing operation.

In particular, the following is proposed: an arrangement having a coordinate measuring machine or microscope, wherein the coordinate measuring machine or the microscope has a capture device having a first image generating device and a second image generating device, wherein the first and the second image generating device are each designed to generate image signals from which it is possible to generate a two-dimensional image, the first image generating device is positioned and designed such that it is possible for it to generate object image signals during the operation of the measurement device by capturing an examination object arranged in a space, that is to say a measurement object of the coordinate measuring machine or an object that is to be examined by way of the microscope, the second image generating device is positioned and designed such that it is possible for it to generate overview image signals by capturing an overview of the space before and/or during the operation of the measurement device, the capture device is furthermore connected to an image processing device of the arrangement, which is connected to the first and the second image generating device to receive generated image information relating to the object and the space, the image processing device is designed to combine a two-dimensional object image, generated from the object image signals, with a two-dimensional perspectively distorted overview image of the space, generated from the overview image signals, to form a two-dimensional output image, and the image processing device is designed to scale the received image information with respect to an image size for forming the output image in a manner such that at least one dimension of the examination object captured both in the object image and in the overview image has the same size in the output image.

In the case of a corresponding method for operating a coordinate measuring machine or microscope in which the coordinate measuring machine or the microscope has a capture device having a first image generating device and a second image generating device, the first and the second image generating device each generate image signals from which a two-dimensional image is generated. Furthermore the first image generating device generates object image signals by capturing an examination object arranged in a space, that is to say a measurement object of the coordinate measuring machine or an object that is to be examined by way of the microscope, the second image generating device generates overview image signals by capturing an overview of the space before, during and/or after the generation of the object image signals by way of the first image generating device, an image processing device, which is connected to the first and the second image generating device, receives generated image information relating to the object and the space, the image processing device combines a two-dimensional object image, generated from the object image signals, with a two-dimensional perspectively distorted overview image of the space, generated from the overview image signals, to form a two-dimensional output image, and the image processing device scales the received image information with respect to an image size for forming the output image in a manner such that at least one dimension of the examination object captured both in the object image and in the overview image has the same size in the output image.

Configurations of the method are evident from the description of configurations of the arrangement. The image processing device can be part of the measurement device or be realized entirely or partially by way of a separate device.

The image processing device receives the image information relating to the object and the space. The image information can be the original image signals of the respective image generating device or it can be the already processed image information from the image signals. In any case, the image processing device is able to receive or generate the two-dimensional image and to perform the scaling. In particular, the scaling can already be performed during the generation of the two-dimensional object image and/or of the two-dimensional overview image. Alternatively thereto, it is possible for a two-dimensional object image and/or a two-dimensional overview image to already be available, and the generating device can perform the scaling thereafter.

The scaling, i.e. size adjustment of an image, can be performed with respect to two linearly independent image directions, that is to say in a two-dimensional digital image having rows and columns of pixels, in particular with respect to the directions of the rows and the columns. Scaling can be performed on the overview image, on the object image, or on both images so as to then combine the available images to form the output image. However, scaling may be performed only on the overview image if only the overview image is perspectively distorted. For example, this may be the case where the first image generating device is telecentric on the object side and therefore the imaging of the object does not result in a perspective distortion.

For example, the object image can be discernible on the output image against the background of the overview image. This can be achieved for example by virtue of the object image being completely discernible in the representation of the output image and of pixels of the object image replacing pixels of the overview image at the respective position of the output image. However, it is likewise possible for elements of the overview image to also be discernible in the output image at positions of the object image. For example, contours of the overview image may show through. This can be achieved for example by pixels at positions of the object image that correspond to the contours being darker or having a specified color in the output image.

All the images that are used to generate the output image, and the output image itself, are in particular digital images that have been combined in particular from a two-dimensional arrangement of picture elements (pixels). It is known that each picture element is positioned at a position in a regular two-dimensional coordinate system of the image and is represented, upon representation by way of an image representation device, at a corresponding position of the representation medium (for example screen or projection surface). The term image is also used when a corresponding data set is present. An image therefore does not generally require that it is, in fact, represented. On the other hand, however, a corresponding data set is always representable, for example on a screen.

The viewing directions of the first image generating device during capturing of the object and of the second image generating device during capturing of the space having the object extend parallel to one another with respect to the space or even coincide. If the first and/or the second image generating device is an image generating device having a rotationally symmetric optical system, the viewing direction is defined by the optical axis of the optical system. Therefore, if the optical axes of the first and second image generating devices coincide, the optical axes therefore extend along the same straight line in the space. This is generally achieved by the overview image signals being generated by the second image generating device at a different time point than when the object image signals are generated by the first image generating device. For example, first the overview image signals can be generated, and then sets of object image signals can be generated repeatedly by the first image generating device, wherein each set of object image signals corresponds to one time point or one brief time period of the capturing of the object and at least one object image is generated from each set. In particular, the viewing directions of the image generating devices extend parallel or on the z-axis of a three-dimensional Cartesian coordinate system x-y-z of the space and consequently perpendicular to the x-y-plane of the space.

Parallel or coinciding viewing directions can be obtained in particular by way of calibrating the two image generating devices with respect to their orientations, for example by using a calibration object that is arranged in the space and captured at least once by each of the image generating devices. During the calibration, the orientation of the image generating device can be set and/or it is possible to ascertain how the image signals generated by the respective image generating device and/or images generated therefrom are corrected by way of calculation. In such a correction, it is in particular also possible for a distortion correction to be ascertained, with the result that after a corresponding performance of the distortion correction, the respectively available corrected image is distortion-free in terms of the achieved accuracy. With respect to the overview image, a distortion does not relate to the perspective distortion. After correction of the distortion, for example, it is, however, possible for a perspective distortion of the overview image to exist, in which the image scale linearly increases along the viewing direction as the distance from the second image generating device increases. In this case, straight beams traveling through the space parallel to the viewing direction are distorted in the image information generated by the second image generating device into beams that converge in the manner of a pyramid.

In particular, the coordinate systems of the image information generated by the two image generating devices can be correlated with one another. Therefore, it is possible to perform a transformation of the image information of the first image generating device into the coordinate system of the image information of the second image generating device, or vice versa, or into a common, third coordinate system with respect to two linearly independent spatial directions, which extend in particular perpendicularly to the viewing directions of both image generating devices. The transformation with respect to the third spatial direction is not necessary because, in accordance with the innovation, at least the overview image is perspectively distorted and in each case scaling and consequently a size adjustment in particular with respect to different positions in or along the viewing direction takes place. In particular, the position can be specified from planning data (for example CAD data) of an object arranged in the space or by a user. In the mentioned case of a three-dimensional Cartesian coordinate system x-y-z, the transformation can have been performed with respect to the coordinates x and y, and the z-position can be ascertained for example in accordance with a test plan from the planning data, i.e. data of the desired shape of the object. If a real object is then measured, it is possible according to the test feature to be determined such as for example a thickness, a diameter or another dimension to ascertain the z-position of the corresponding surface or of the corresponding region of the object. To this end, it is possible to establish in advance in a manner known per se the relationship of the coordinate system of the planning data to the coordinate system of the space in which the object is arranged, for example by recording a plurality of images of the object, by determining form features of the object from the images, and by correlating said form features with the corresponding form features from the planning data.

The coordinate systems can be correlated with one another in particular by way of recording a calibration object from the same recording position or from recording positions with the same viewing direction. For example, the calibration object is recorded by both image generating devices in a manner such that a marked point of the calibration object—such as for example a circle center of a circular calibration object—is in each case located in the image center of the generated image information. If a movement of a movable holder of the measurement device is required for the same recording position or for recording positions with the same viewing direction, the movement or the distance traveled can be ascertained by way of a movement measurement system. It is possible to immediately ascertain therefrom the two-dimensional transformation vector that is required for a transformation of the image information of the first image generating device into the coordinate system of the image information of the second image generating device, or vice versa, with respect to the two linearly independent spatial directions in a plane perpendicular to the viewing direction.

In particular, the stated dimension of the object that has the same size after the scaling in the object image and in the overview image for the formation of the output image is defined such that it is to be determined along at least one line or in one surface, wherein the line or the surface extends perpendicularly to a viewing direction of the first image generating device during the capturing of the examination object arranged in the space. With respect to the stated case of the three-dimensional Cartesian coordinate system x-y-z, the line or the surface is therefore located for example in a plane that is the x-y-plane of the space or a plane that is parallel thereto.

In particular, the image generating device can be designed to position image information from the overview image in the output image such that a first local region of the overview image, in which part of the captured examination object or the entire captured examination object is imaged, and a second local region of the object image, in which the same part of the captured examination object or the entire captured examination object is imaged in the same size as in the overview image, form the same local region in the output image. In particular, the orientation of the imaged part of the captured examination object or of the entire captured examination object is also the same in the combination of the overview image and the object image in the output image. Upon representation of the output image, the examination object or the part thereof is therefore discernible in the correct position and in the same viewing direction. It should be noted that the overview image in many cases images a greater part of the examination object than the object image. If therefore the object image images only a part of the examination object, said imaged part is, however, in most cases also imaged by the overview image and the corresponding local regions are imaged in the output image in the correct position and with the same orientation. The first local region of the overview image is here uniquely defined in the output image because other regions of the overview image adjoin it. However, image information of the first local region of the overview image may not be contained or only be partially contained in the output image and, instead, only or primarily image information of the second local region of the object image may be contained in the output image. In particular in this common local region, the image information from the object image is typically the image information that is of greater importance for the user.

The image scale of the first and of the second image generating device can be ascertained in each case in advance for a common plane in the space, wherein the viewing directions of the two image generating devices extend perpendicular to said common plane. The image planes of the two-dimensional images generated by the image processing device then likewise extend perpendicular to the viewing directions. The viewing directions at least of one of the image generating devices can extend in particular along the optical axis. The common plane may be a plane of a surface on which the examination object is able to be placed, for example a surface of a placement plate or of an object holder. It has already been mentioned above that said surface can be a base or a plate that constitutes a delimitation of the space in which the examination object is able to be arranged.

The image scale can be ascertained for example by way of positioning a flat calibration object, which has known dimensions in both directions transversely to the viewing direction, on the common plane. At least one image of the calibration object is then generated with each of the image generating devices and the relationship of the imaging of the calibration object to the known dimensions is established. In the case of the second image generating device, which captures the space in a perspectively distorted fashion, this type of determination of the image scale can likewise be performed in at least one further plane that extends parallel to the common plane. This also applies to the first image generating device if it is not telecentric on the object side. If the image scale increases linearly as the distance from the respective image generating device increases, for example taking into consideration a correction of the optical distortion, the linear dependence can alternatively or additionally be taken into account in the determination. In particular, there are image generating devices having optical systems that have a point at which all object beams intersect in particular after the correction of the optical distortion. At this point, the image scale is therefore zero.

Furthermore, the calibration can also be used to ascertain at least one common point in the coordinate systems of the first and of the second image generating device. For example, it is possible to use herefor in each case a uniquely ascertainable point of the captured calibration object.

During the scaling of the received image information with respect to the image size, it is therefore possible for previously ascertained image scales with respect to a distance of the examination object to be taken into account. In other words, for each distance, an image scale that applies thereto should be used. In the case of imaging that is telecentric on the object side and for which, under certain circumstances, initially a distortion correction has been performed, the image scale is not dependent on the distance from an imaged object. In particular, the distance can be the distance of an image point of the examination object from the image generating device. For example, in the case of the optical system having a point at which all object beams intersect, the zero point for the determination of the distance can be located at said point of intersection. The distance can be determined in particular in a manner such that, for an arbitrary point that is not located in the viewing direction, the distance of a plane that extends perpendicular to the viewing direction is considered. However, it is also possible either to ascertain in each case the distance for a plurality of image points of the examination object and for the individual image scale to be taken into account for each point, or it is possible for an average value of the distance to be ascertained and for the image scale of the average distance to be taken into account. The average value can be for example an arithmetic mean or a weighted mean. As mentioned above, the dimension of the examination object may have been captured both in the object image and in the overview image. The dimension has the same size due to the scaling, extends along a line or a surface perpendicular to the viewing direction. The dimension consequently relates to an object region the points of which are all located at the same distance from the image generating device.

If the image information was scaled taking into account the image scales with respect to the image size such that the at least one dimension of the examination object captured both in the object image and in the overview image (or part of said examination object) has the same size in the output image, it is optionally additionally possible, on the basis of the ascertained relationship between the coordinate systems of the first and of the second image generating device, for the correspondence of the first local region of the overview image and of the second local region of the object image to be established in the output image. It is possible here in particular to take account of the fact that the overview image is perspectively distorted. If therefore the relationship between the coordinate systems for example in relation to the stated common plane has been established, it is possible, taking into account the distance of the local region from said plane, to likewise ascertain the relationship of the coordinate systems. This in turn makes it possible to establish for local regions at any position the correspondence of the first local region of the overview image and of the second local region of the object image in the output image.

With respect to the aforementioned coordinate system x-y-z, it is therefore possible, in the case of the viewing direction extending in the z-direction, for the image scale in dependence on the z-value to be known and in particular to be ascertained in advance. The relationship of the coordinate systems of the first and of the second image generating device can be known, and can in particular have been ascertained in advance, with respect to the x-y-plane at a defined z-position. The z-position is in particular located in the common plane of the image generating devices for which the scale has been or is ascertained.

In particular, the image processing device can be designed to scale differently after a relative movement of the first image generating device and the space, generation of new object image signals by way of a new capturing of the object and/or capturing of another object in the space, the receipt of image information corresponding to the new object image signals, and the receipt of movement information relating to the relative movement than before. In particular, it is possible, taking into account the movement information, for a two-dimensional object image, which has been generated from the new object image signals, to be combined with a two-dimensional perspectively distorted overview image of the space, which has been scaled differently in accordance with the relative position of the first image generating device and the space, said relative position having changed after the relative movement, to form a two-dimensional output image. In this case, scaling is effected such that at least one dimension of the object captured both in the object image and in the overview image has the same size in the output image. The movement information can be generated for example by a movement measurement system of the measurement device and be received by the latter. Alternatively or additionally thereto, a user may input the movement information.

The arrangement can furthermore have an input device for inputting a selected image position in the overview image, wherein a movement controller of the measurement device is designed to control a movement of the first image generating device in a manner such that the first image generating device is moved to a capturing position from which it captures a partial region of the space imaged in the overview image and thereby generates object image signals. An object imaged at the selected image position is located here in the partial region, and the dimension of the object captured both in the object image and in the overview image relates to an object region of the object that is located in said partial region. In this way, it is possible to automatically generate a suitable object image in dependence on the input, and the scaling is furthermore automatically performed. The selection of the image position and the input thereof can be automatic, for example while working through a specified test plan. Alternatively or additionally thereto, a user may select and input the image position.

The method for operating a coordinate measuring machine can be defined by the following clauses.

1. A method for operating a coordinate measuring machine or microscope, wherein the coordinate measuring machine or the microscope has a capture device having a first image generating device and a second image generating device, wherein the first and the second image generating device each generate image signals from which a two-dimensional image is generated, and wherein the first image generating device generates object image signals by capturing an examination object arranged in a space, that is to say a measurement object of the coordinate measuring machine or an object that is to be examined by way of the microscope, the second image generating device generates overview image signals by capturing an overview of the space before, during and/or after the generation of the object image signals by way of the first image generating device, an image processing device, which is connected to the first and the second image generating device, receives generated image information relating to the object and the space, the image processing device combines a two-dimensional object image, generated from the object image signals, with a two-dimensional perspectively distorted overview image of the space, generated from the overview image signals, to form a two-dimensional output image, and the image processing device scales the received image information with respect to an image size for forming the output image in a manner such that at least one dimension of the examination object captured both in the object image and in the overview image has the same size in the output image.

2. The method as per clause 1, wherein the image processing device positions image information from the overview image in the output image such that a first local region of the overview image, in which part of the captured examination object or the entire captured examination object is imaged, and a second local region of the object image, in which the same part of the captured examination object or the entire captured examination object is imaged in the same size as in the overview image, form the same local region in the output image.

3. The method as per clause 1 or 2, wherein the dimension of the object is defined such that it is to be determined along at least one line or in one surface, wherein the line or the surface extends perpendicularly to a viewing direction of the first image generating device during the capturing of the examination object arranged in the space.

4. The method as per one of the clauses 1 to 3, wherein the image processing device, after a relative movement of the first image generating device and the space, generation of new object image signals by way of a new capturing of the object and/or capturing of another object in the space, the receipt of image information corresponding to the new object image signals, and the receipt of movement information relating to the relative movement, combines, taking into account the movement information, a two-dimensional object image, which has been generated from the new object image signals, with a two-dimensional perspectively distorted overview image of the space, which has been scaled differently in accordance with the relative position of the first image generating device and the space, said relative position having changed after the relative movement, to form a two-dimensional output image, with the result that at least one dimension of the object captured both in the object image and in the overview image has the same size in the output image.

5. The method as per one of the clauses 1 to 4, wherein a selected image position in the overview image is received, wherein a movement of the first image generating device is controlled such that the first image generating device is moved to a capturing position from which it captures a partial region of the space imaged in the overview image and thereby generates object image signals, wherein an object imaged at the selected image position is located in the partial region, and wherein the dimension of the object captured both in the object image and in the overview image relates to an object region of the object that is located in said partial region.

BRIEF DESCRIPTION OF THE DRAWINGS

Exemplary embodiments of the invention will now be described with reference to the accompanying drawing. In the individual figures of the drawing.

DETAILED DESCRIPTION

Figure 1:
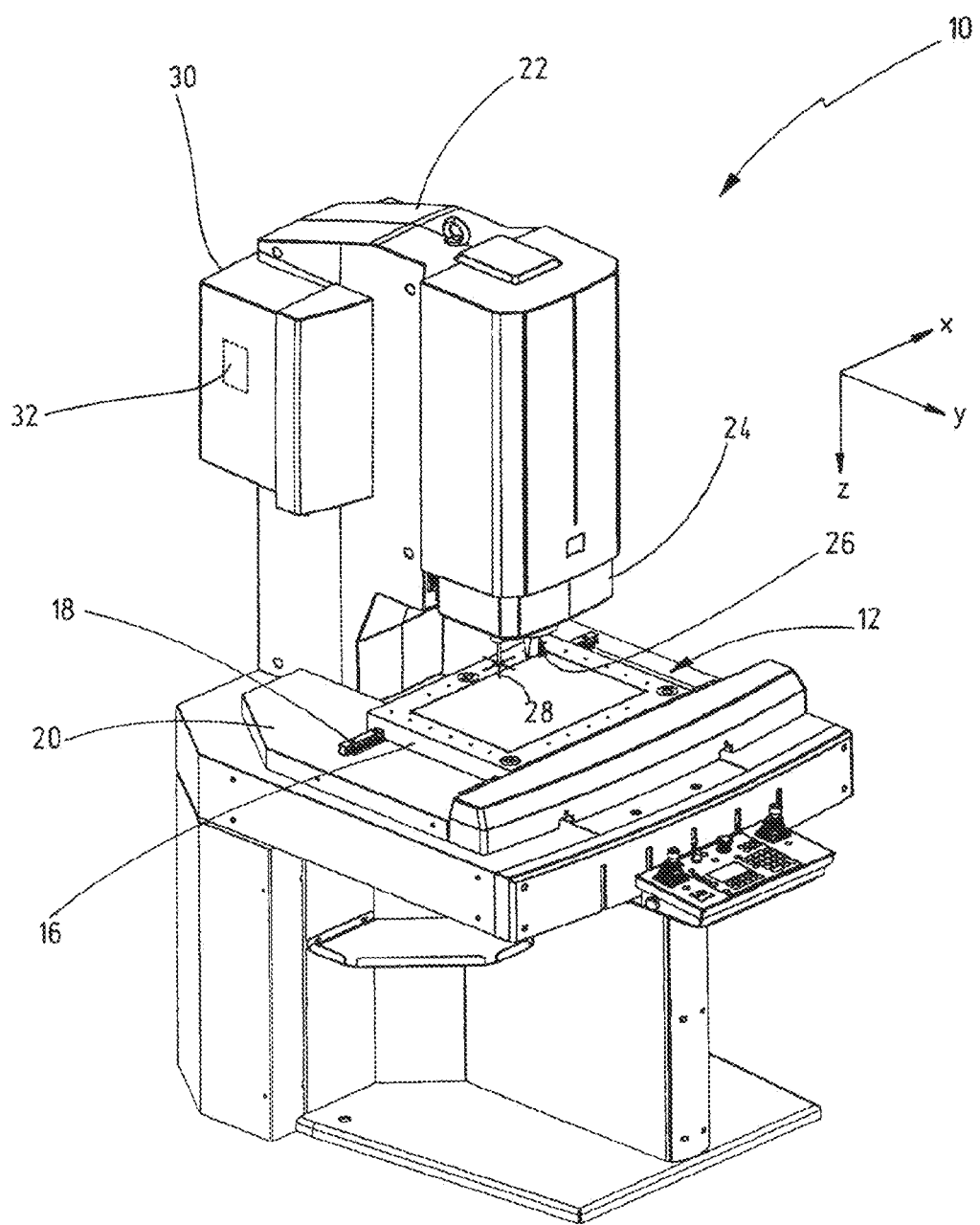
FIG. 1 shows a coordinate measuring machine having a movable workpiece support and a movable sensor, FIG. 2 schematically shows a block diagram of an arrangement having a capture device, an image processing device, and an image representation device.

FIG. 1 shows a coordinate measuring machine 10 in accordance with one exemplary embodiment of the innovation. The coordinate measuring machine 10 has a workpiece support 12, realized here in the form of a translation stage, i.e. displaceable in the horizontal directions x and y of the Cartesian coordinate system x-y-z of the coordinate measuring machine 10. Such translation stages are also referred to as x-y-stages. The workpiece support 12 serves for positioning a measurement object (not illustrated in FIG. 1), which can be measured by the coordinate measuring machine 10.

The workpiece support 12 in this case has an upper part 16, which is movable along two guide rails 18 in a first direction, the x-direction. The guide rails 18 are arranged on a lower part 20 of the workpiece support 12, which lower part is movable along further guide rails (not discernible in FIG. 1) in a second spatial direction, the y-direction.

The reference numeral 22 denotes a column, along which a carriage 24 is movable in a third spatial direction, the z-direction. The carriage 24 carries an optical sensor 26 as a first image generating device for generating image signals of the measurement object. Said object image signals form the measurement information for the measurement of the measurement object. In addition, the carriage 24 can carry a tactile sensor 28. Instead of the optical sensor 26 or the tactile sensor 28, an overview camera can be mounted on the carriage 24, in particular temporarily, as a second image generating device. The overview camera provides overview image signals, from which a two-dimensional overview image for measurement objects and for accessory parts (for example a magazine for interchangeable sensors) is generated, in particular is generated by the overview camera itself.

The present innovation, however, is not limited to such coordinate measuring machines and can likewise be used in a coordinate measuring machine that has a different holding structure for the optical sensor with different movement directions for moving the sensor than shown in FIG. 1. For example, the coordinate measuring machine can have, instead of the holding structure with the translation stage 12 and the column 22, a holding structure of bridge design, portal design, horizontal-arm design or other designs including hexapods.

The reference numeral 30 in FIG. 1 denotes an evaluation and control unit, which is arranged in the exemplary embodiment on the fixed column 22. The evaluation and control unit 30 serves for moving the respectively used sensor 26, 28 or the overview camera into a desired measurement position relative to a measurement object on the workpiece support 12.

In addition, the evaluation and control unit 30 is able to determine coordinates of selected measurement points on the measurement object and subsequently geometric properties of the measurement object. A processor 32 of the evaluation and control unit 30, by which the object image can be visualized together with the overview image by way of controlling a screen, which is not illustrated in FIG. 1, is illustrated schematically.

The evaluation and control unit 30 can also be realized differently than illustrated. For example, it can be divided over two separate components, wherein in particular the evaluation unit can be realized as a computer separate from the coordinate measuring machine. Alternatively or in addition thereto, it is possible to use, instead of a screen, a different image representation device, such as an image projector.

In all cases, including cases that have not been mentioned, the image processing device, which combines the two-dimensional object image with the two-dimensional perspectively distorted overview image of the space, can be part of the evaluation and control unit and/or be realized by a device that is separate from the coordinate measuring machine, such as a computer for example. For example, a processor of the evaluation and control unit, in particular the aforementioned processor 32, or a processor of the separate computer can provide and perform, controlled by software, the function of the image processing device. Not only with reference to the exemplary embodiment that was described on the basis of FIG. 1, the first image generating device, a further device, such as an evaluation and control unit of the coordinate measuring machine, or the image processing device can generate the two-dimensional object image from the object image signals of the first image generating device.

The movability of a microscope can be realized in the same way as in the coordinate measuring machine illustrated in FIG. 1, that is to say the workpiece or observation object can be supported by a support that is movable in one direction or in two independent directions, and the optical sensor can be movable in a direction that is independent in particular linearly independent, of the movement direction or the movement directions of the support.

Figure 2:
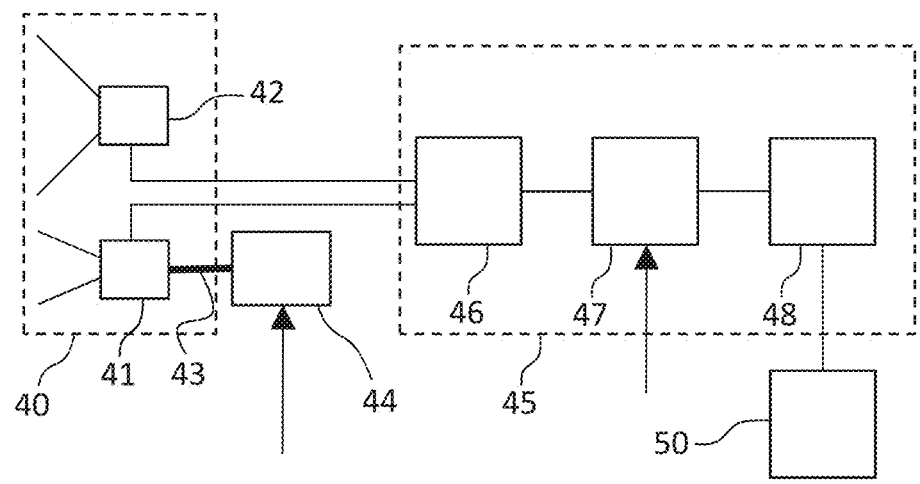

FIG. 2 shows, in the left-hand part of the figure, a capture device 40 with a first image generating device 41 for generating object image signals and with a second image generating device 42 for generating overview image signals. The first image generating device 41 is connected to a drive apparatus 44 via a drive mechanical system 43, with the result that a movement of the first image generating device 41 is drivable in particular in the viewing direction thereof (to the left in FIG. 2). As is indicated by an arrow extending toward the drive apparatus 44, the drive apparatus 44 can be controlled, for example by transmitting a signal containing information relating to the position of the first image generating device 41 that is to be set. Unlike what is illustrated in FIG. 2, the drive apparatus or a further drive apparatus can be designed to move, alternatively or in addition, the examination object (not illustrated in FIG. 2). In any case, a relative movement between the examination object and the first image generating device is brought about by the drive apparatus or by the drive apparatuses during their operation.

As is indicated by in each case a line proceeding from the image generating devices 41, 42, the latter are connected to an image processing device 45, in the exemplary embodiment specifically to a pre-processing device 46 of the image processing device 45. An output of the pre-processing device 46 is connected to an input of a scaling device 47 of the image processing device 45. An output of the scaling device 47 is connected to an input of a positioning device 48 of the image processing device 45. An output of the positioning device 48 is in turn connected to an image representation device 50, for example a screen.

The capture device 40 illustrated in FIG. 2 can in particular be part of a coordinate measuring machine, such as the coordinate measuring machine illustrated in FIG. 1, or part of a microscope. As has already been described on the basis of FIG. 1, the image processing device 45 can also be for example a part of a control and evaluation computer of the coordinate measuring machine. Alternatively, it can be part of a microscope or be provided separately from the coordinate measuring machine or the microscope.

The function of the arrangement illustrated in FIG. 2 is as follows, for example: before, during and/or after the generation of the object image signals of an examination object by way of the first image generating device 41, the second image generating device 42 generates image signals of the space in which the examination object is located. The generated image signals are transferred to the pre-processing device 46, which is a device that is optionally provided and can also be omitted. The pre-processing device 46 corrects in the image information for example the optical distortion in each case of the first or second image generating device. Consequently, corrected image information relating to the examination object and corrected image information relating to the space are available at the output of the pre-processing device 46, the former in the form of a two-dimensional object image. Said image information is transferred to the scaling device 47.

The scaling device 47 scales the received image information with respect to an image size such that at least one dimension of the examination object captured both in the object image and in the overview image has the same size in the output image. The output image is prepared by the scaling device. However, it is generated in the exemplary embodiment by the positioning device 48. In particular, the scaling device 47 may merely scale the image information of the overview image. This is the case in particular if the first image generating device is an image generating device that is telecentric on the object side. In the exemplary embodiment, the dimension can be for example the radius or diameter of the circular upper surface 5 of the cylinder or the curvature of the outer boundary 4 thereof.

The image information processed by the scaling device 47 is transferred to the positioning device 48, which positions image information from the overview image in the output image such that a first local region of the overview image, in which part of the captured examination object or the entire captured examination object is imaged, and a second local region of the object image, in which the same part of the captured examination object or the entire captured examination object is imaged in the same size as in the overview image, form the same local region in the output image.

The scaling performed by the scaling device 47 can be carried out for example in the case of digital image information by way of allocating a corresponding image scale. The image scale both of the object image and of the overview image at the output of the scaling device 47 can in particular be related to the dimensions of the output image to be produced. Said image scale is thus defined differently than the aforementioned image scales that are related to real dimensions for example of the examination object or of the space or of a calibration object that was arranged earlier in the space.

The positioning device 48 performs the positioning for example in the case of digital image data such that in particular the object image is repositioned with respect to a coordinate system of the output image such that the local regions of the object image and of the overview image correspond to one another.

The output image generated by the positioning device 48 is output to the image generating device 50 and represented thereby.

FIG. 2 furthermore indicates by way of an arrow extending to the scaling device 47 that information required for the scaling, i.e. information relating to the z-position in the space coordinate system x-y-z, is able to be input. In particular, this required information can furthermore contain information relating to the position of the examination object in the space and/or information relating to the position of the part of the examination object in the space captured by the object image. This position information can in this case still be related to a common plane of the coordinate systems of the two image generating devices 41, 42. In this case, the positioning device 48 ascertains the position in the plane with respect to which the scaling was performed as soon as it has received the corresponding image information and also, in the exemplary embodiment, the position information from the scaling device 47.

Figure 3:
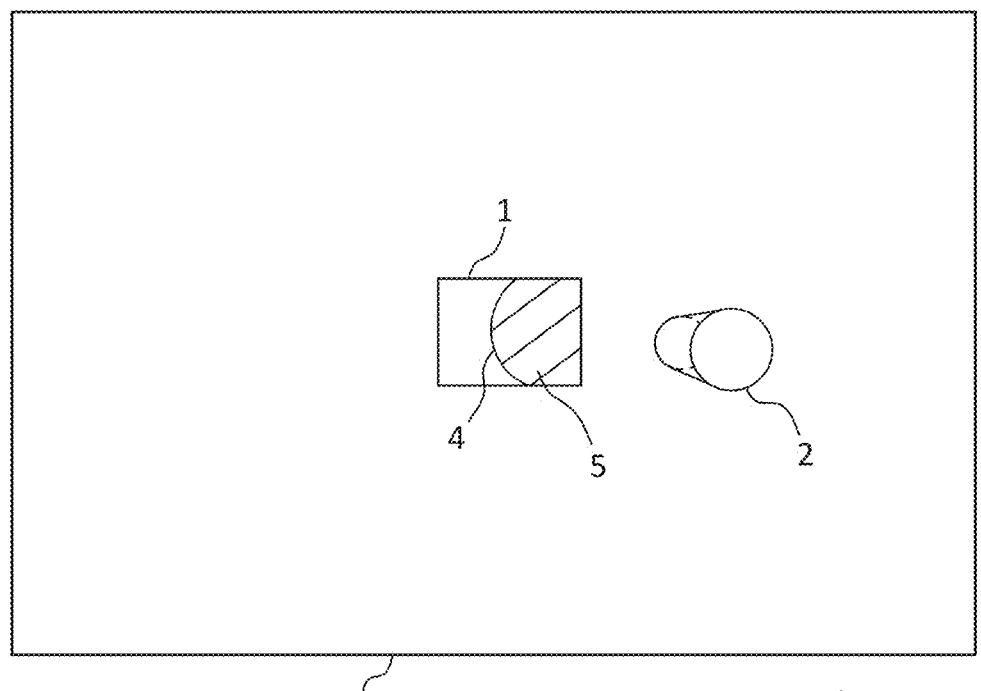
FIG. 3 shows an output image that would be produced from an object image and an overview image without scaling.

FIG. 3 shows an object image 1, which is arranged centrally in a possible output image 3. The object image 1 is two-dimensional, which is indicated by a rectangular external boundary of the object image 1. The object image 1 shows an outer boundary 4 of a circular surface 5, which is indicated in FIG. 3 and the following figures in hatched fashion by way of three diagonal lines. The object image 1, however, shows only part of the outer boundary 4 of the circular surface 5.

Furthermore, FIG. 3 shows on the right of the output image 3 an image 2 of a cylinder in a perspective distorted illustration. At the time point that the overview image signals were generated, the base of the cylinder was located further away from the second image generating device than the upper surface of the cylinder imaged in the foreground. The base is therefore likewise illustrated in the shape of a circle like the upper surface. However, due to the perspective distortion of the overview image, it is smaller than the upper surface and is covered by the cylinder shaft and the upper surface. The shaft is shown to be transparent for the sake of the discernibility of the base.

Figure 4:
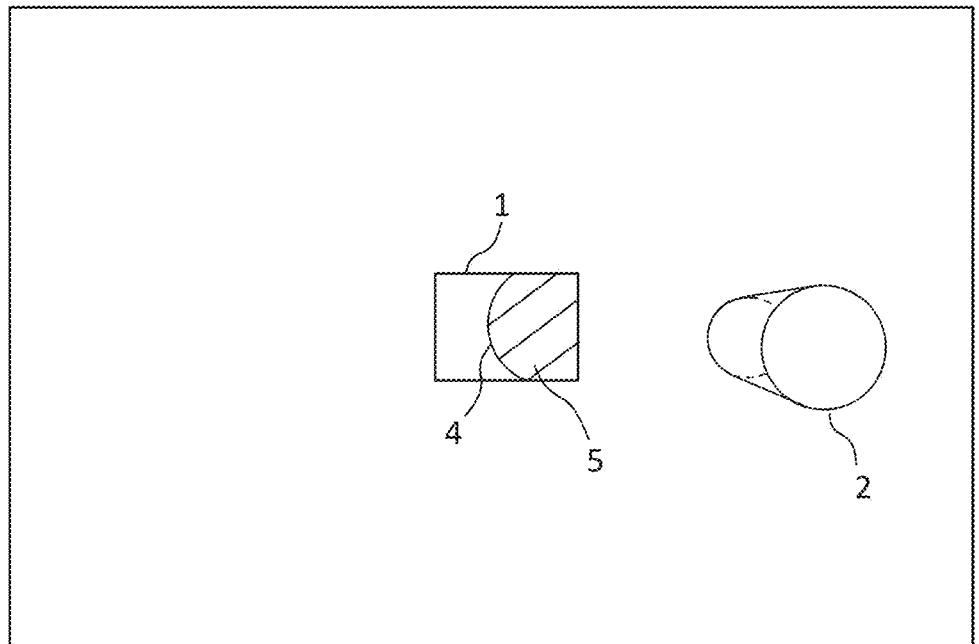
FIG. 4 shows an output image having the same object image as in FIG. 3, but wherein the overview image has been scaled, with the result that a dimension of the examination object captured both in the object image and in the overview image has the same size in the output image.
Figure 5:
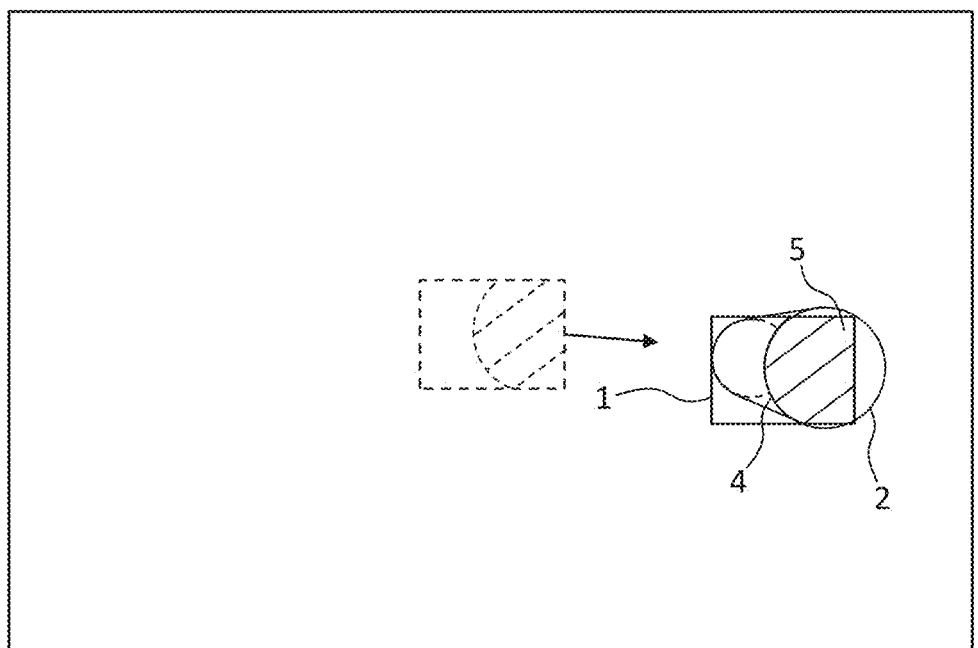
FIG. 5 shows an output image as in FIG. 4, but wherein the object image has been made to coincide with the corresponding local region of the overview image.

FIGS. 3 to 5 are simplified illustrations. The overview image generally has image components in addition to the examination object. In the case of FIGS. 3 to 5, the mentioned cylinder is the examination object, wherein the object image images merely part of the upper surface of the cylinder.

In FIG. 3, the part of the upper surface of the cylinder captured by the object image 1 is greater than the corresponding part of the upper surface in the overview image. Accordingly, FIG. 4 shows the state after the scaling. The scaling was performed by magnifying the image 2 of the cylinder as compared to FIG. 3, such that the size of the upper surface now corresponds to the size in the object image 1. This means in particular that the radius of curvature of the outer boundary of the upper surface of the cylinder matches in both images. Generally, during scaling, it is possible that not only the examination object, but the entire overview image and/or the object image is scaled.

The output image 3 illustrated in FIG. 4 is also not yet the output image that is ultimately output for representation, because the position of the region of the circular surface 5 of the cylinder that is imaged in the object image 1 does not yet correspond to the position of the image 2 of the cylinder in the overview image. By way of a corresponding displacement of the object image 1, as is indicated in FIG. 5 by an arrow pointing to the right, the correspondence of the position is achieved. The outer boundary 4 of the upper surface 5 of the cylinder illustrated by the object image 1 now corresponds to a portion of the outer boundary that is imaged in the image 2 of the cylinder. The object image 1 in its earlier position according to FIG. 4 is illustrated by dashed lines in FIG. 5.

It becomes obvious in terms of the scaling with reference to the exemplary embodiment of FIG. 4 that a detail change of the overview image occurs when scaling only the overview image and also when scaling the overview image and the object image, certainly if the size of the output image is fixed. Therefore, in the exemplary embodiment of FIG. 4, a smaller detail of the overview image is presented and the position of the image 2 of the cylinder is moved to the right with respect to FIG. 3. Generally, the image detail becomes smaller in the case of a scaling of the overview image that constitutes a magnification of the image components of the overview image, and vice versa. In particular situations, this can result in the output image no longer being completely filled by the overview image. By contrast, the object image in most cases images a region of the space that is so small that, in the output image, it covers or forms merely a small portion of the output image in simultaneous representation with the overview image. The phrase at least one of A, B, and C should be construed to mean a logical (A OR B OR C), using a non-exclusive logical OR, and should not be construed to mean "at least one of A, at least one of B, and at least one of C."

LIST OF REFERENCE SIGNS

1 Object image
3 Output image
4 Outer boundary
5 Circular surface
10 Coordinate measuring machine
12 Workpiece support
16 Upper part
18 Guide rails
20 Lower part
22 Column
24 Carriage
26 Optical sensor
28 Tactile sensor
30 Evaluation and control unit
32 Processor
40 Capture device
41 First image generating device
42 Second image generating device
43 Drive mechanical system
44 Drive apparatus
45 Image processing device
46 Pre-processing device
47 Scaling device
48 Positioning device
50 Image generating device

What is claimed is:

1. An examination device that is at least one of a coordinate measuring machine and a microscope, the examination device comprising:
   a capture device including a first image generating device and a second image generating device and
   an image processing device connected to the first image generating device and the second image generating device of the capture device,
   wherein:
   the first image generating device and the second image generating device are each configured to generate image signals, from which a two-dimensional image is generatable,
   the first image generating device is positioned and configured to generate object image signals during operation of the examination device by capturing an examination object arranged in a space,
   the second image generating device is positioned and configured to generate overview image signals by capturing an overview of the space before and/or during the operation of the examination device, and
   the image processing device is configured to:
      receive image information included in the generated object image signals and the generated overview image signals, wherein the image information relates to the examination object and the space,
      combine (i) a two-dimensional object image, generated from the object image signals, with (ii) a two-dimensional perspectively distorted overview image of the space, generated from the overview image signals, to form a two-dimensional output image, and
      scale the received image information with respect to an image size to form the output image in a manner such that at least one dimension of the examination object captured both in the object image and in the overview image has a same size in the output image.

2. The examination device of claim 1, wherein the image processing device is configured to, after:
 a relative movement of the first image generating device and the space,
 generation of new object image signals by way of a new capturing of the examination object and/or capturing of another examination object in the space,
 receipt of image information corresponding to the new object image signals, and
 receipt of movement information relating to the relative movement,
combine, taking into account the movement information, a two-dimensional object image, generated from the new object image signals, with a two-dimensional perspectively distorted overview image of the space, scaled differently in accordance with a relative position of the first image generating device and the space, the relative position being a changed relative position after the relative movement, to form a new two-dimensional output image,
wherein at least one dimension of the examination object captured both in the new object image and in a new overview image has a same size in the new two-dimensional output image.

3. A system comprising:
the examination device of claim 1 and
an input device for input of a selected image position in the overview image, wherein:
the examination object is located in a partial region of the space imaged in the overview image,
a movement controller of the examination device is configured to control a movement of the first image generating device such that the first image generating device is moved to a capturing position from which the first image generating device is configured to capture the partial region of the space imaged in the overview image and thereby generate the object image signals, and
the dimension of the examination object captured both in the object image and in the overview image relates to an object region of the examination object that is located in the partial region.

4. The examination device of claim 1, wherein the image processing device is configured to position image information from the overview image in the output image such that a first local region of the overview image, in which part of the captured examination object or the entire captured examination object is imaged, and a second local region of the object image, in which the same part of the captured examination object or the entire captured examination object is imaged in the same size as in the overview image, form the same local region in the output image.

5. The examination device of claim 4, wherein the image processing device is configured to,
after:
 a relative movement of the first image generating device and the space,
 generation of new object image signals by way of a new capturing of the examination object and/or capturing of another examination object in the space,
 receipt of image information corresponding to the new object image signals, and
 receipt of movement information relating to the relative movement,
combine, taking into account the movement information, a two-dimensional object image, generated from the new object image signals, with a two-dimensional perspectively distorted overview image of the space, scaled differently in accordance with a relative position of the first image generating device and the space, the relative position being a changed relative position after the relative movement, to form a new two-dimensional output image,
wherein at least one dimension of the examination object captured both in the new object image and in a new overview image has a same size in the new two-dimensional output image.

6. The examination device of claim 4, wherein:
the dimension of the examination object is defined such that it is to be determined along at least one line or in one surface and
the at least one line or the one surface extends perpendicularly to a viewing direction of the first image generating device during the capturing of the examination object arranged in the space.

7. The examination device of claim 6, wherein the image processing device is configured to,
after:
 a relative movement of the first image generating device and the space,
 generation of new object image signals by way of a new capturing of the examination object and/or capturing of another examination object in the space,
 receipt of image information corresponding to the new object image signals, and
 receipt of movement information relating to the relative movement,
combine, taking into account the movement information, a two-dimensional object image, generated from the new object image signals, with a two-dimensional perspectively distorted overview image of the space, scaled differently in accordance with a relative position of the first image generating device and the space, the relative position being a changed relative position after the relative movement, to form a new two-dimensional output image,
wherein at least one dimension of the examination object captured both in the new object image and in a new overview image has a same size in the new two-dimensional output image.

8. The examination device of claim 1, wherein:
the dimension of the examination object is defined such that it is to be determined along at least one line or in one surface and
the at least one line or the one surface extends perpendicularly to a viewing direction of the first image generating device during the capturing of the examination object arranged in the space.

9. The examination device of claim 8, wherein the image processing device is configured to,
after:
 a relative movement of the first image generating device and the space,
 generation of new object image signals by way of a new capturing of the examination object and/or capturing of another examination object in the space,
 receipt of image information corresponding to the new object image signals, and
 receipt of movement information relating to the relative movement,
combine, taking into account the movement information, a two-dimensional object image, generated from the new object image signals, with a two-dimensional perspectively distorted overview image of the space, scaled differently in accordance with a relative position of the first image generating device and the space, the relative position being a changed relative position after the relative movement, to form a new two-dimensional output image,
wherein at least one dimension of the examination object captured both in the new object image and in a new overview image has a same size in the new two-dimensional output image.

10. A method for operating an examination device that is at least one of a coordinate measuring machine and a microscope, wherein the examination device includes a capture device including a first image generating device and a second image generating device, the method comprising:
generating, by each of the first image generating device and the second image generating device, image signals from which a two-dimensional image is generated;
generating, by the first image generating device, object image signals by capturing an examination object arranged in a space;
generating, by the second image generating device, overview image signals by capturing an overview of the space at least one of before, during, and after the generation of the object image signals by way of the first image generating device;
receiving, by an image processing device connected to the first and second image generating devices, image information included in the generated object image signals and the generated overview image signals, wherein the image information relates to the examination object and the space;
combining, by the image processing device, a two-dimensional object image, generated from the object image signals, with a two-dimensional perspectively distorted overview image of the space, generated from the overview image signals, to form a two-dimensional output image; and
scaling, by the image processing device, the received image information with respect to an image size to form the output image in a manner such that at least one dimension of the examination object captured both in the object image and in the overview image has a same size in the output image.

11. The method of claim 10, wherein:
a selected image position in the overview image is received,
the examination object is located in a partial region of the space imaged in the overview image,
a movement of the first image generating device is controlled such that the first image generating device is moved to a capturing position from which the first image generating device captures the partial region of the space imaged in the overview image and thereby generates the object image signals, and
the dimension of the examination object captured both in the object image and in the overview image relates to an object region of the examination object that is located in the partial region.

12. The method of claim 10, further comprising positioning image information from the overview image in the output image such that a first local region of the overview image, in which part of the captured examination object or the entire captured examination object is imaged, and a second local region of the object image, in which the same part of the captured examination object or the entire captured examination object is imaged in the same size as in the overview image, form the same local region in the output image.

13. The method of claim 12, wherein:
a selected image position in the overview image is received,
the examination object is located in a partial region of the space imaged in the overview image,
a movement of the first image generating device is controlled such that the first image generating device is moved to a capturing position from which the first image generating device captures the partial region of the space imaged in the overview image and thereby generates the object image signals, and
the dimension of the examination object captured both in the object image and in the overview image relates to an object region of the examination object that is located in the partial region.

14. The method of claim 12, wherein:
the dimension of the examination object is defined such that it is to be determined along at least one line or in one surface and
the at least one line or the one surface extends perpendicularly to a viewing direction of the first image generating device during the capturing of the examination object arranged in the space.

15. The method of claim 14, further comprising:
receiving a selected image position in the overview image, wherein:
the examination object is located in a partial region of the space imaged in the overview image,
a movement of the first image generating device is controlled such that the first image generating device is moved to a capturing position from which the first image generating device captures the partial region of the space imaged in the overview image and thereby generates the object image signals, and
the dimension of the examination object captured both in the object image and in the overview image relates to an object region of the examination object that is located in the partial region.

16. The method of claim 10, wherein:
the dimension of the examination object is defined such that it is to be determined along at least one line or in one surface and
the at least one line or the one surface extends perpendicularly to a viewing direction of the first image generating device during the capturing of the examination object arranged in the space.

17. The method of claim 16, further comprising:
receiving a selected image position in the overview image, wherein:
the examination object is located in a partial region of the space imaged in the overview image,
a movement of the first image generating device is controlled such that the first image generating device is moved to a capturing position from which the first image generating device captures the partial region of the space imaged in the overview image and thereby generates the object image signals, and
the dimension of the examination object captured both in the object image and in the overview image relates to an object region of the examination object that is located in the partial region.

18. The method of claim 10, further comprising, after:
a relative movement of the first image generating device and the space, generation of new object image signals by way of a new capturing of the examination object and/or capturing of another examination object in the space, receipt of image information corresponding to the new object image signals, and receipt of movement information relating to the relative movement, combining, taking into account the movement information, a two-dimensional object image, generated from the new object image signals, with a two-dimensional perspectively distorted overview image of the space, scaled differently in accordance with a relative position of the first image generating device and the space, the relative position being a changed relative position after the relative movement, to form a new two-dimensional output image, wherein at least one dimension of the examination object captured both in the new object image and in a new overview image has a same size in the new two-dimensional output image.

19. The method of claim 18, wherein:

a selected image position in the overview image is received, the examination object is located in a partial region of the space imaged in the overview image, a movement of the first image generating device is controlled such that the first image generating device is moved to a capturing position from which the first image generating device captures the partial region of the space imaged in the overview image and thereby generates the object image signals, and the dimension of the examination object captured both in the object image and in the overview image relates to an object region of the examination object that is located in the partial region.

\* \* \* \* \*